United States Patent
Kao

(10) Patent No.: US 9,463,733 B1
(45) Date of Patent: Oct. 11, 2016

(54) LAMP DEVICE FOR A VEHICLE

(71) Applicant: TKS INDUSTRIAL CO., LTD., Tainan (TW)

(72) Inventor: Chung-Hsu Kao, Tainan (TW)

(73) Assignee: TKS INDUSTRIAL CO., LTD., Tainan (TW)

( * ) Notice: Subject to any disclaimer, the term of this patent is extended or adjusted under 35 U.S.C. 154(b) by 2 days.

(21) Appl. No.: 14/660,632

(22) Filed: Mar. 17, 2015

(51) Int. Cl.
*B60Q 3/04* (2006.01)
*B60Q 1/04* (2006.01)
*B60Q 1/34* (2006.01)

(52) U.S. Cl.
CPC .. *B60Q 1/04* (2013.01); *B60Q 1/34* (2013.01)

(58) Field of Classification Search
CPC . B60Q 1/18; B60Q 1/2607; B60Q 2300/142
USPC ................................. 362/543–546, 548, 549
See application file for complete search history.

(56) References Cited

U.S. PATENT DOCUMENTS

2010/0232174 A1* 9/2010 Arakawa ............... B60Q 1/2661
362/547
2015/0003083 A1* 1/2015 Uehara ................. F21S 48/212
362/418

* cited by examiner

*Primary Examiner* — William Carter
(74) *Attorney, Agent, or Firm* — Muncy, Geissler, Olds & Lowe, P.C.

(57) ABSTRACT

A lamp device for a heavy duty vehicle includes a lamp housing unit having a base plate and a surrounding wall which cooperatively define an opening facing laterally, a light-transmissive lampshade cooperating with the base plate and the surrounding wall to define a chamber which is in communication with the opening, a low beam unit and a high beam unit mounted in the chamber, and a turning lamp unit including a plurality of turning lamps which are mounted on the base plate such that light emitted therefrom is visible through the opening.

9 Claims, 6 Drawing Sheets

LAMP DEVICE FOR A VEHICLE

FIELD

This disclosure relates to a lamp device for a vehicle, more particularly to a lamp device for mounting on a heavy duty vehicle.

BACKGROUND

Referring to FIG. 1, a conventional lamp device 11 for a heavy duty vehicle 12, such as a truck, a trailer, etc., is mounted on a mounting area 121 in a left or right side of a head of the vehicle 12, and includes a lamp housing unit 110 which is disposed on the mounting area 121 and which defines two separate mounting areas 101 to respectively accommodate a headlight 111 and a first turning lamp 112, and a second turning lamp 113 which is disposed on an outer side of the vehicle 12 and which is put on with the first turning lamp 113 for indicating a turning operation to other vehicles, such as vehicles at the side. Since the headlight 111 and the first turning lamp 112 are respectively mounted in the separate mounting areas 101, light emitted from the headlight 111 and the first turning lamp 112 is limited in the individual areas 101 with limited lighting range thereof. Moreover, it is required to dispose the additional second turning lamps 113 to the heavy duty vehicle at two sides, which results in high manufacturing and replacing cost.

SUMMARY

An object of the present disclosure is to provide a lamp device which has a larger lighting range and which can indicate forwardly and laterally a turning operation to coming and lateral vehicles and passersby.

According to this disclosure, the lamp device includes a lamp housing unit, a light-transmissive lampshade, a low beam unit, a high beam unit, and a turning lamp unit. The lamp housing unit includes a base plate which has a front plate surface that faces forwardly and that extends in a transverse direction to terminate at a lateral edge, and a surrounding wall which surrounds a peripheral of the base plate and which has an outside wall portion that is disposed rearwardly of the lateral edge and that cooperates with the lateral edge to define an opening therebetween. The light-transmissive lampshade has a shade periphery which is connected to the surrounding wall, a front shade body which is disposed forwardly of and spaced apart from the front plate surface of the base plate to cooperatively define a chamber, and a side shade body which is disposed laterally of and spaced apart from the lateral edge of the base plate to shield the opening that is in communication with the chamber. The low beam unit is mounted on the lamp housing unit and in the chamber. The high beam unit is mounted on the lamp housing unit and in the chamber, and is spaced apart from the low beam unit. The turning lamp unit includes a plurality of turning lamps which are spaced apart from each other and which are mounted on the base plate such that light emitted therefrom is visible through the opening.

BRIEF DESCRIPTION OF THE DRAWINGS

Other features and advantages of the present disclosure will become apparent in the following detailed description of the embodiment of the disclosure, with reference to the accompanying drawings, in which.

DETAILED DESCRIPTION OF THE EMBODIMENT

Figure 1:
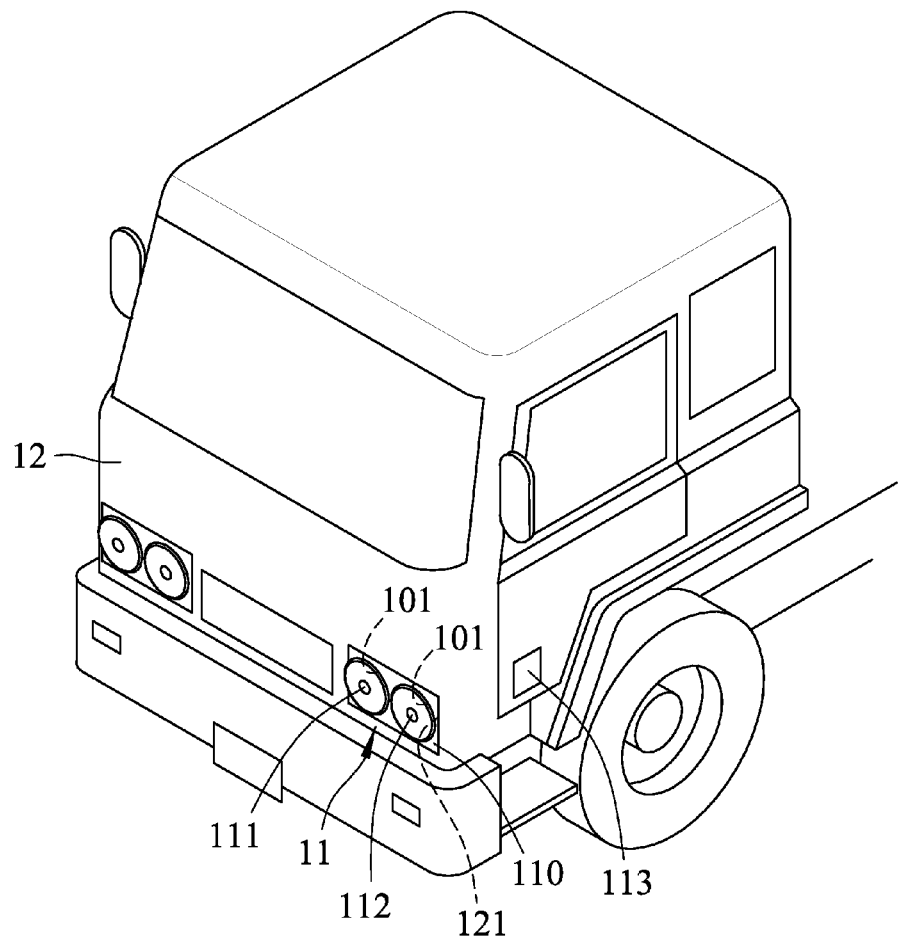
FIG. 1 is a perspective view of a conventional lamp device for a vehicle.
Figure 2:
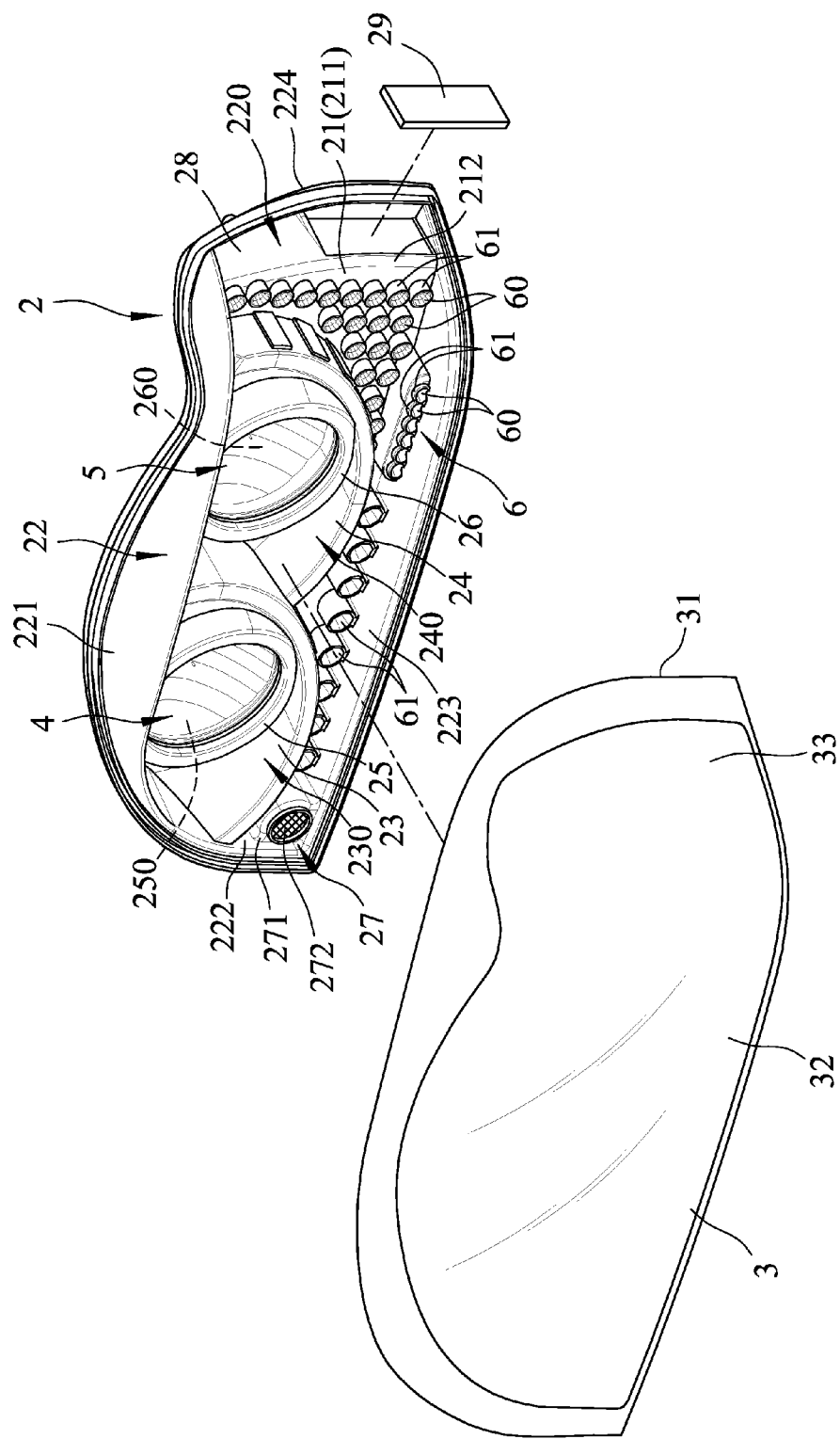
FIG. 2 is an exploded perspective view of an embodiment of a lamp device according to this disclosure.
Figure 3:
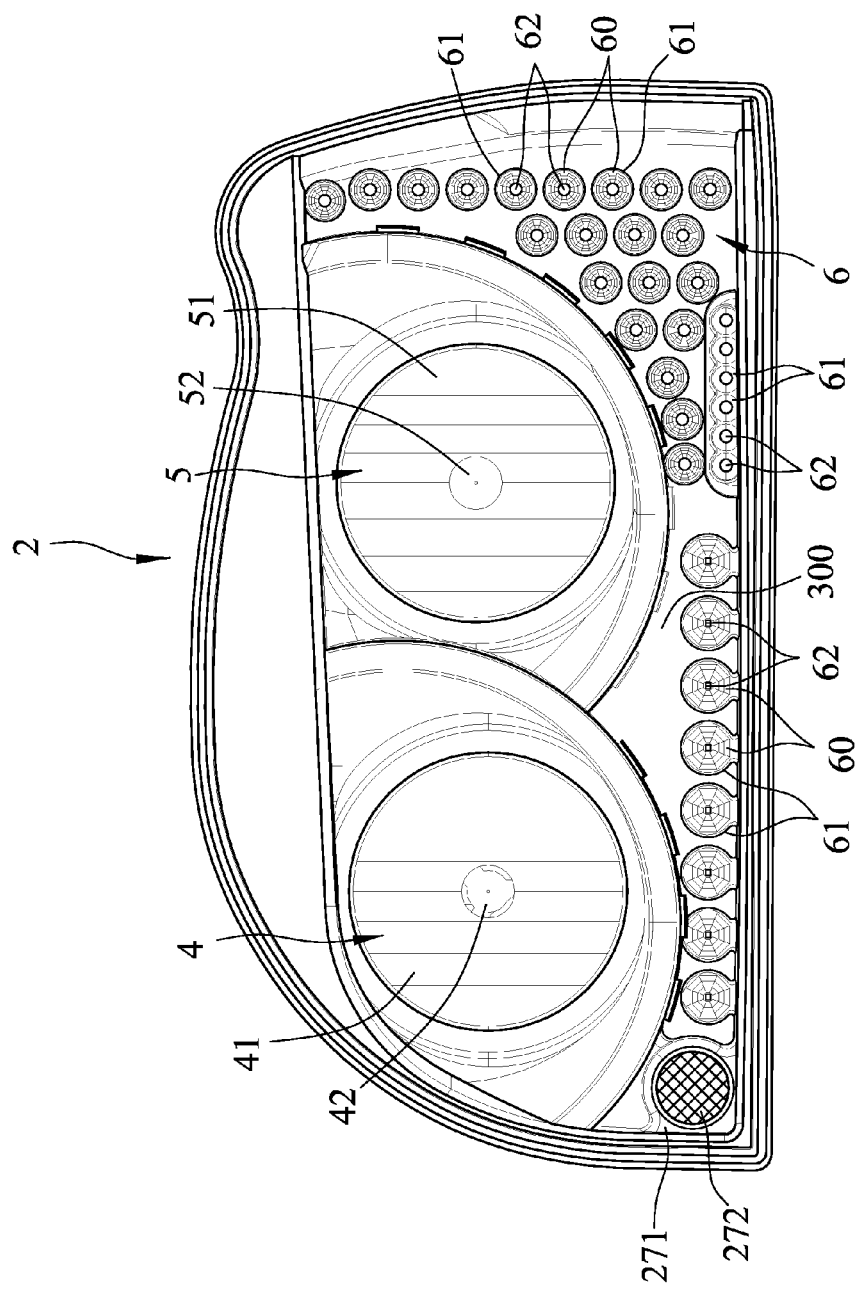
FIG. 3 is a front view of the embodiment.

Referring to FIGS. 2 and 3, an embodiment of a lamp device according to the present disclosure is adapted to be mounted on a heavy duty vehicle, and is shown to comprise a lamp housing unit 2, and a light-transmissive lampshade 3 covering the lamp housing unit 2. On the lamp housing unit 2, a low beam unit 4 and a high beam unit 5 are disposed and spaced apart from each other. A turning lamp unit 6 is disposed on the lamp housing unit 2.

The lamp housing unit 2 includes a base plate 21 which has a front plate surface 211 that faces forwardly and that extends in a transverse direction to terminate at a lateral edge 212, and a surrounding wall 22 which surrounds a peripheral of the base plate 21 and which has an outside wall portion 224 that is disposed rearwardly of the lateral edge 212 of the base plate 21 and that cooperates with the lateral edge 212 to define an opening 220 therebetween. The surrounding wall 22 further has upper and lower wall portions 221, 223 which extend forwardly of the front plate surface 211 of the base plate 21 and which are opposite to each other in an upright direction, and an inside wall portion 222 which interconnects the upper and lower wall portions 221, 223 and which is opposite to the outside wall portion 224 in the transverse direction.

Figure 4:
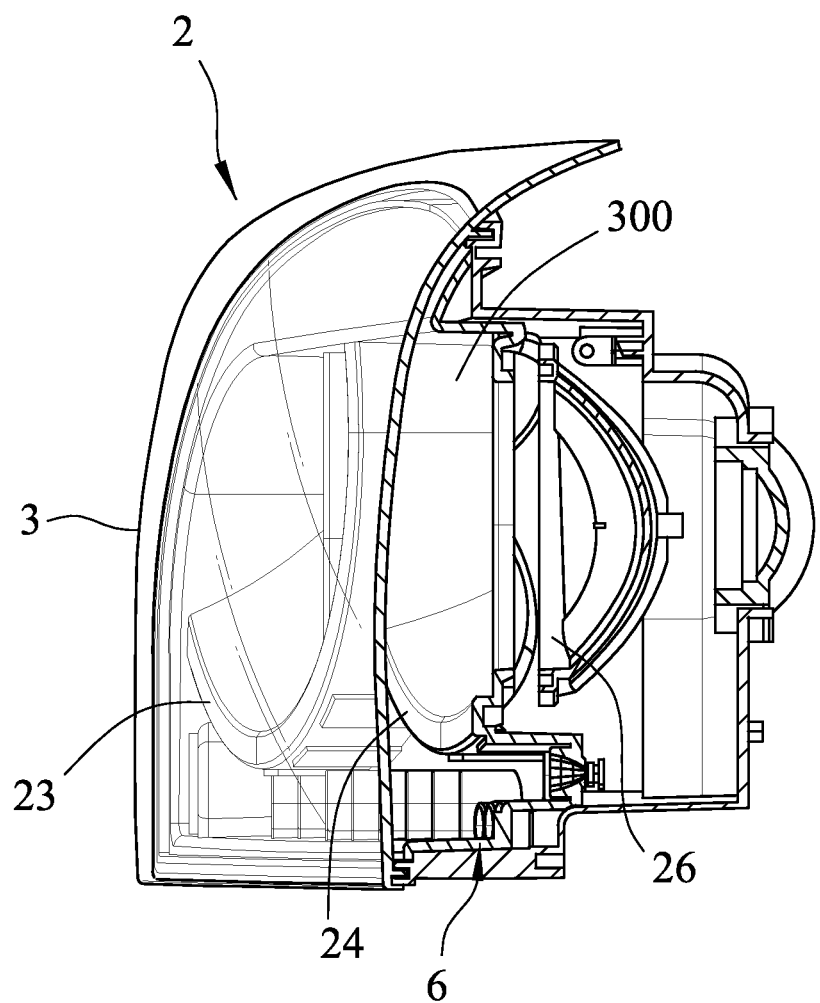
FIG. 4 is a sectional view of the embodiment.

Referring to FIGS. 2 and 4, the light-transmissive lampshade 3 has a shade periphery 31 which is connected to the surrounding wall 22, a front shade body 32 which is disposed forwardly of and spaced apart from the front plate surface 211 of the base plate 21 to cooperatively define a chamber 300, and a side shade body 33 which is disposed laterally of and spaced apart from the lateral edge 212 of the base plate 21 to shield the opening 220 that is in communication with the chamber 300. In this embodiment, the lamp housing unit 2 further includes an extension plate 28 which extends rearwardly from the lateral edge 212 of the base plate 21, and a side reflection member 29 which is attached to the extension plate 28 and which faces the opening 220. The side reflection member 29 may be colored with visible color, such as red, yellow, etc.

Referring again to FIGS. 2 and 3, the lamp housing unit 2 further includes a first arcuate plate 23, a second arcuate plate 24, a first reflecting seat 25, a second reflecting seat 26, and a reflecting mechanism 27. The first arcuate plate 23 is integrally formed with and extends forwardly from the front plate surface 211 of the base plate 21 to be disposed in the chamber 300, and is spaced apart from the front shade body 32 of the lampshade 3. The first arcuate plate 23 is configured to define a first receiving space 230, and has two ends which are engaged with the upper wall portion 221 and the inside wall portion 222 of the surrounding wall 22, respectively. The second arcuate plate 24 is integrally formed with and extends forwardly from the front plate surface 211 of the base plate 21 to be disposed in the chamber 300, and is spaced apart from the front shade body 32 of the lampshade 3. The second arcuate plate 24 is configured to define a second receiving space 240, and has two ends which are engaged with the upper wall portion 221 of the surrounding wall 22 and the first arcuate plate 23, respectively. The first reflecting seat 25 is disposed in the first receiving space 230, and is integrally formed with and extends forwardly from the first arcuate plate 23. The first reflecting seat 25 is configured to define a first mounting area 250. The second reflecting seat 26 is disposed in the second receiving space 240, and is integrally formed with and extends forwardly from the second arcuate plate 24. The second reflecting seat 26 is configured to define a second mounting area 260. The reflecting mechanism 27 is disposed on the base plate 21 and below the first arcuate plate 23. The reflecting mechanism 27 includes an extension seat 271 which is integrally formed with and extends forwardly from the base plate 21, and a front reflection member 272 which is disposed on the extending seat 271 and which faces forwardly. The front reflection member 272 has a micro-structure regularly distributed on a front surface thereof such that light emitted from a coming vehicle is diffused through the micro-structure so as to obtain attention of the coming vehicle.

As shown in FIGS. 2 and 4, the first arcuate plate 23, the second arcuate plate 24, the first reflecting seat 25, and the second reflecting seat 26 are spaced apart from the front shade body 32 of the lampshade 3 such that the chamber 300 has an integral single space and is in communication with the opening 220.

Referring to FIGS. 3 and 4, the low beam unit 4 and the high beam unit 5 are disposed in the first and second mounting areas 250, 260, respectively. The low beam unit 4 includes a first reflecting wall 41 which is disposed in the first mounting area 250 and which faces forwardly, and a first lamp 42 which is disposed on the first reflecting wall 41. The high beam unit 5 includes a second reflecting wall 51 which is disposed in the second mounting area 260 and which faces forwardly, and a second lamp 52 which is disposed on the second reflecting wall 51. The low beam unit 4 and the high beam unit 5 are disposed in the chamber 300 such that lighting emitted from any one of the first and second lamps 42, 52 can spread over the chamber 300 and the opening 220 and a lighting range is not confined by the first reflecting seat 25 or the second reflecting seat 26. Moreover, the first reflecting wall 41 may have a curve surface to reflect light emitted from the first lamp 42 to a certain direction. Also, the first reflecting seat 25 and the first arcuate plate 23 can reflect the light so as to increase the lighting range and guide the light. Similarly, the second reflecting wall 51, the second reflecting seat 26 and the second arcuate plate 24 can reflect and guide light emitted from the second lamp 52. It is noted that light emitted from the low beam unit 4 has a smaller included angle relative to a horizontal plane than that emitted from the high beam unit 5 so that the light emitted from the high beam unit 5 has a longer radiation distance than that emitted from the low beam unit 4.

The turning lamp unit 6 includes a plurality of condensing seats 61 which are integrally formed with and extend forwardly from the base plate 21 and which are configured to define a plurality of accommodation areas 60, respectively, and a plurality of turning lamps 62 which are spaced apart from one another and which are disposed respectively in the accommodation areas 60 such that light emitted therefrom is visible through the opening 220. Light emitted from each of the turning lamps 62 is condensed by the respective condensing seat 61 to be more attractive. In this embodiment, the condensing seats 61 are arranged outwardly of the first receiving space 230 of the first arcuate plate 23 and the second receiving space 240 of the second arcuate plate 24. The turning lamps 62 are put on simultaneously to indicate a turning operation to other vehicles and passersby. The turning lamps 62 may be arranged to form together as a pointing sign, such as an arrowhead or the like.

Figure 5:
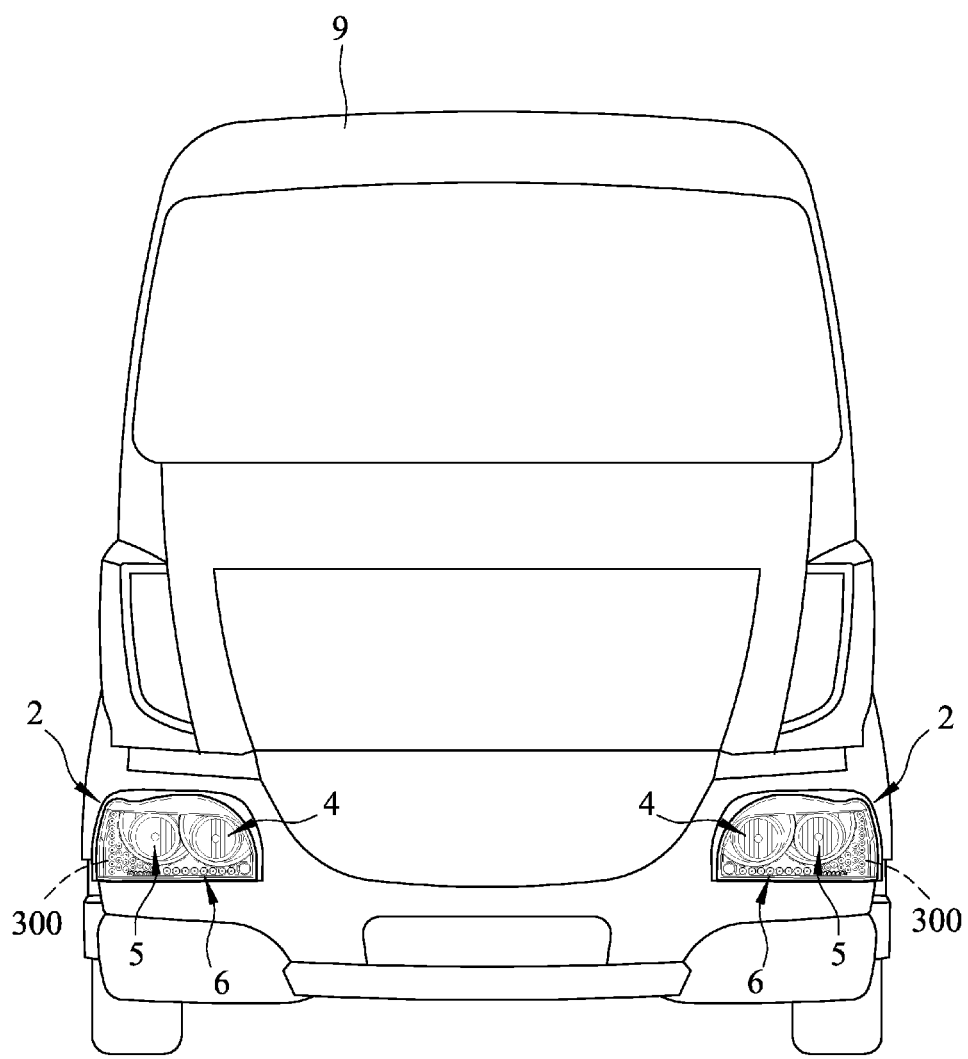
FIG. 5 is a front view of a heavy duty vehicle employed with the lamp device of the embodiment.

Referring to FIG. 5 in combination with FIG. 3, a heavy duty vehicle 9 is employed with two lamp devices 2 of the embodiment. For each of the lamp devices 2 of the embodiment, light emitted from the low beam unit 4 and the high beam unit 5 can be guided and reflected by the first arcuate plate 23, the second arcuate plate 24, the first reflecting seat 25 and the second reflecting seat 26 such that the lighting range spreads over the chamber 300 and the opening 220. Thus, the light emitted from the low beam unit 4 and the high beam unit 5 is clearly visible for the coming vehicles. Light emitted from the turning lamps 62 disposed in the chamber 300 can be clearly visible for the coming vehicles.

Figure 6:
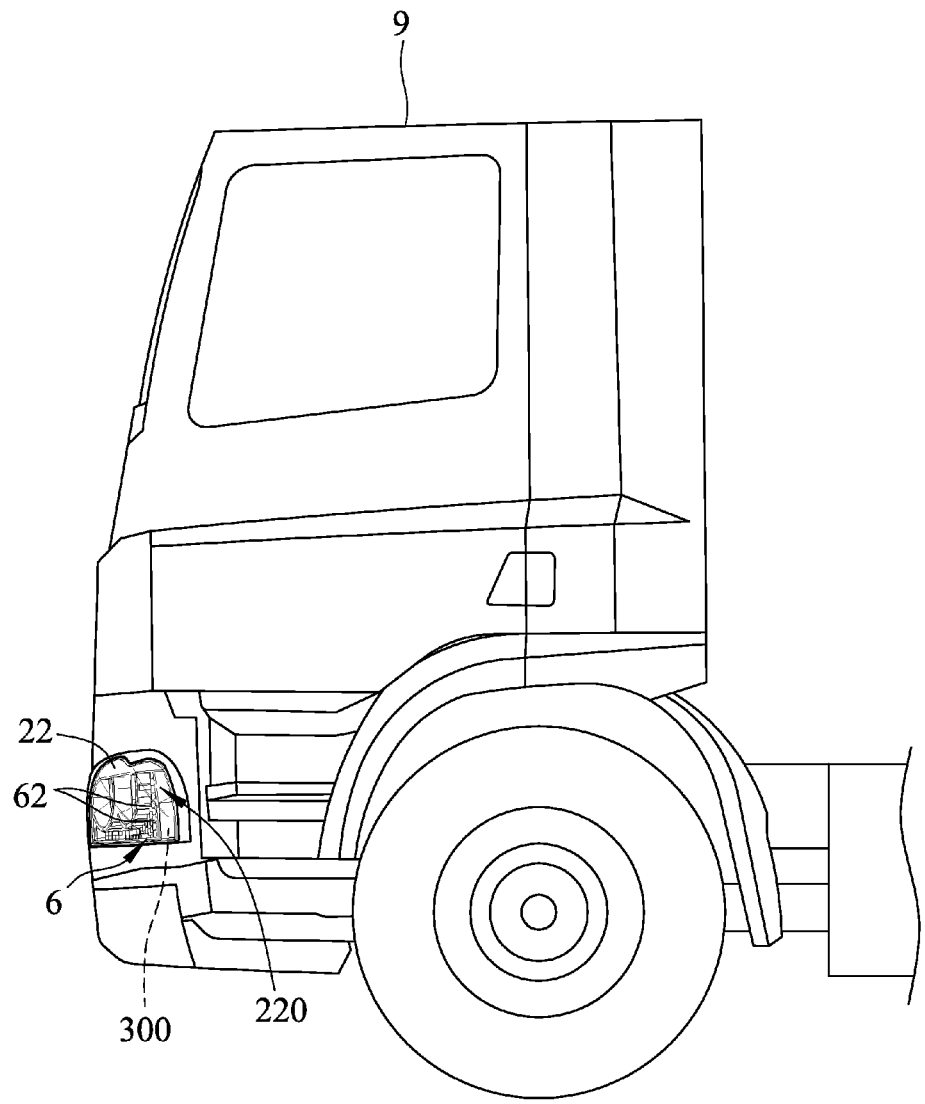
FIG. 6 is a fragmentary side view of a heavy duty vehicle employed with the lamp device of the embodiment.

Referring to FIG. 6 in combination with FIG. 2, for each of the lamp devices 2 of the embodiment, by virtue of the opening 220 in communication with the chamber 300 and facing laterally, light emitted from the turning lamps 62 can emit through the opening 220 so as to be visible for lateral vehicles and passersby.

As illustrated, with the chamber 300 having an integral single space and in communication with the opening 220, lighting from the low beam unit 4 and the high beam unit 5 can spread over the chamber 300 and the lighting range is not limited within the first and second mounting areas 250, 260. Moreover, the turning lamp unit 6 can emit light forwardly and laterally so as to indicate a turning operation to coming and lateral vehicles and passersby. Accordingly, additional turning lamps mounted on two sides of a vehicle are not required, which reduces a manufacturing cost of the lamp device.

While the present disclosure has been described in connection with what is considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:
1. A lamp device for being mounted on a heavy duty vehicle, comprising:
  a lamp housing unit including a base plate which has a front plate surface that faces forwardly and that extends in a transverse direction to terminate at a lateral edge, and a surrounding wall which surrounds a peripheral of said base plate and which has an outside wall portion that is disposed rearwardly of said lateral edge and that cooperates with said lateral edge to define an opening therebetween;
  a light-transmissive lampshade having a shade periphery which is connected to said surrounding wall, a front shade body which is disposed forwardly of and spaced apart from said front plate surface of said base plate to cooperatively define a chamber, and a side shade body which is disposed laterally of and spaced apart from said lateral edge of said base plate to shield said opening that is in communication with said chamber;
  a low beam unit mounted on said lamp housing unit and in said chamber;
  a high beam unit mounted on said lamp housing unit and in said chamber, and spaced apart from said low beam unit; and a turning lamp unit including a plurality of turning lamps which are spaced apart from each other and which are mounted on said base plate such that light emitted therefrom is visible through said opening;

said surrounding wall further having upper and lower wall portions which extend forwardly of said front plate surface of said base plate and which are opposite to each other in an upright direction, and an inside wall portion which interconnects said upper and lower wall portions and which is opposite to said outside wall portion in the transverse direction;

said lamp housing unit further including
- a first arcuate plate which extends forwardly from said front plate surface of said base plate, which is disposed in said chamber, and which is spaced apart from said front shade body, said first arcuate plate being configured to define a first receiving space, and having two ends which are engaged with said upper wall portion and said inside wall portion of said surrounding wall, respectively,
- a second arcuate plate which extends forwardly from said front plate surface of said base plate, which is disposed in said chamber, and which is spaced apart from said front shade body, said second arcuate plate being configured to define a second receiving space, and having two ends which are engaged with said upper wall portion of said surrounding wall and said first arcuate plate, respectively,
- a first reflecting seat which is disposed in said first receiving space and which extends forwardly from said first arcuate plate, said first reflecting seat being configured to define a first mounting area, and
- a second reflecting seat which is disposed in said second receiving space and which extends forwardly from said second arcuate plate, said second reflecting seat being configured to define a second mounting area;

said low beam unit and said high beam unit being disposed in said first and second mounting areas, respectively.

2. The lamp device as claimed in claim 1, wherein said turning lamps are disposed outwardly of said first receiving space and said second receiving space.

3. The lamp device as claimed in claim 1, wherein said low beam unit includes a first reflecting wall which is disposed in said first mounting area and which faces forwardly, and a first lamp which is disposed on said first reflecting wall.

4. The lamp device as claimed in claim 1, wherein said high beam unit includes a second reflecting wall which is disposed in said second mounting area and which faces forwardly, and a second lamp which is disposed on said second reflecting wall.

5. The lamp device as claimed in claim 1, wherein said first arcuate plate and said second arcuate plate are integrally formed with and forwardly extend from said base plate.

6. The lamp device as claimed in claim 1, wherein said turning lamp unit further includes a plurality of condensing seats which extend forwardly from said base plate and which are configured to define a plurality of accommodation areas, respectively, said turning lamps being disposed respectively in said accommodation areas.

7. The lamp device as claimed in claim 1, wherein said lamp housing unit further includes a reflecting mechanism disposed on said base plate and below said first arcuate plate.

8. The lamp device as claimed in claim 7, wherein said reflecting mechanism includes an extension seat which extends forwardly from said base plate, and a front reflection member which is disposed on said extending seat and which faces forwardly.

9. The lamp device as claimed in claim 1, wherein said lamp housing unit further includes an extension plate which extends rearwardly from said lateral edge of said base plate, and a side reflection member which is attached to said extension plate and which faces said opening.

* * * * *